United States Patent
Thomas et al.

(10) Patent No.: US 6,239,966 B1
(45) Date of Patent: May 29, 2001

(54) TWO-PART LOCKABLE HOUSING

(75) Inventors: Gerhard Thomas, Fuerth; Karl Wutz, Sengenthal; Ehrenfried Fabry, Hersbruck, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/169,394

(22) Filed: Oct. 9, 1998

(30) Foreign Application Priority Data

Oct. 18, 1997 (DE) ................................. 297 18 540

(51) Int. Cl.$^7$ ........................................ H02B 1/04
(52) U.S. Cl. ................. 361/616; 70/246; 200/43.22; 312/215
(58) Field of Search ............... 174/66, 67; 74/2, 74/89.14, 625; 312/215, 222, 223.1; 335/14, 20; 70/183, 184, 186, 202, 203, 211, 212, 245, 246, 252; 200/50.1, 50.12, 50.13, 43.14, 43.15, 43.22; 361/600, 605, 607–610, 615, 616, 724, 727

(56) References Cited

U.S. PATENT DOCUMENTS

| 4,074,091 | * | 2/1978 | Bischof . |
| 5,157,577 | * | 10/1992 | Balavd . |
| 5,180,051 | * | 1/1993 | Cook . |
| 5,663,862 | * | 9/1997 | Hopping-Mills . |
| 5,691,518 | * | 11/1997 | Jones . |
| 5,906,120 | * | 5/1999 | Thacker . |
| 5,912,444 | * | 6/1999 | Godesa . |
| 5,963,420 | * | 10/1999 | Bailey . |

FOREIGN PATENT DOCUMENTS

4312025  *  10/1994  (DE)  ..................................... 361/616

* cited by examiner

Primary Examiner—Gerald Tolin
(74) Attorney, Agent, or Firm—Kenyon & Kenyon

(57) ABSTRACT

A housing, in particular for electric switchgear and control gear, includes a first housing part and a second housing part to be detachably attached to the former. The housing also includes a lock whose at least one blocking element is movable in a displacement direction from an open position into a closed position by an operating slide connected to it, with the first housing part having at least one element engageable in a recess in the second housing part in the closed position, with a seating face arranged parallel to the displacement direction, and a section of the blocking element being in contact with the seating face on a side of the recess opposite the operating slide.

16 Claims, 2 Drawing Sheets

TWO-PART LOCKABLE HOUSING

FIELD OF THE INVENTION

The present invention relates to a housing with a lock, in particular for electric switchgear and control gear.

BACKGROUND INFORMATION

Housings for electric switchgear and control gear, with a housing cover that can be attached to a housing base body by a lock, are known. The lock has a blocking element displaceably attached to the housing cover and operable by an operating slide connected to it. In the closed position, the locking element engages with a seating face arranged on the housing base body and thus prevents the housing cover from being removed from the housing base body. Because of their size, these conventional locks are difficult to mount on difficult-to-access locations on the housing. Furthermore, there is the risk that the lock might be unintentionally shifted into an open position because of the forward-projecting operating slide, so that in most cases an additional screw closure must be provided on the housing cover.

SUMMARY OF THE INVENTION

An object of the present invention is to improve on a housing so that the housing provides for a lock that can be opened without a tool and operated even in tight spaces.

According to the present invention, the housing has a lock with an operating slide arranged over a blocking element. In the closed position, the blocking element, which is displaceably attached to the second housing part, rests on a seating face of a means arranged in the recess of the second housing part and prevents the means from escaping from the recess in the second housing part. Since the means is fixedly attached to the first housing part, the second housing part cannot be separated from the first housing part when the lock is in the closed position.

This advantageously leads to a form-fitting lock of the housing that can be operated without a tool even in tight spaces in a vehicle. The lock makes it possible in particular to attach a housing cover to a housing base body by simply manually operating the operating slide from an open position into a closed position. With this compact lock, the interior of the housing can be extremely well protected from environmental effects while nevertheless being rapidly accessible.

According to the present invention, the seating face in the closed position is arranged between the operating slide and the section of the blocking element. This advantageously yields an especially compact lock, because the operating slide is arranged over the blocking element, and therefore the blocking element does not project beyond the lock at the side.

The operating slide is displaceably arranged on the outside of the housing above the recess and is connected to the blocking element by a web, in particular a web passing through the recess. Therefore, the operating slide can be displaced easily by manual force on the outside of the housing, and the blocking element arranged inside the housing prevents unlocking of the means arranged inside the recess.

The operating slide is preferably essentially flat and arranged parallel to the engagement face of the blocking element. Therefore, the operating slide projects only slightly forward on the outside housing wall, so that the risk of unwanted unlocking is reduced. The operating slide, which is designed to be essentially flat, may have two ergonomically shaped recessed grips for manual operation of the lock from an open position into a closed position and vice versa. The bottom side of the locking part arranged inside the housing is designed in a T shape due to the fact that the flat operating slide is arranged parallel to the section of the blocking element designed as an engagement face, and the two are connected by a web.

The second housing part has a slot, arranged at the side of the recess in the housing wall, along which the web is guided in the direction of displacement.

Due to the T-shaped design of the bottom side of the lock, the lock is attached in a form-fitting manner to the housing wall, arranged around the recess and the slot, of the second housing part, in particular of a housing cover, in the open position and during the displacement operation. Due to the fact that the operating slide, which has a flat design and is arranged outside the housing, is in contact with the housing wall on the outside in the area around the recess and the slot, the lock is attached to the second housing part in a manner that prevents it from being lost.

According to the present invention, the at least one means is a hook under which the section of the blocking element is engaged with the seating face on its side facing away from the operating slide of the lock. The open side of the hook with a flat design is arranged perpendicular to the direction of displacement of the lock, so that the blocking element can be brought to the seating face below the hook, engaging there in the closed position and thus preventing removal of the second housing part from the hook. According to the present invention, the narrow web of the lock can be guided past the open side of the hook in the displacement operation, while at the same time the blocking element engages with the hook on the seating face from the side.

In an especially advantageous exemplary embodiment of the present invention, the lock has two blocking elements arranged on a narrow web perpendicular to the seating face and projecting slightly from it at the side. The narrow web passing through the recess is arranged perpendicular to the operating slide and the two blocking elements designed as small plates, with the blocking elements projecting on both sides of the web, and on one side of the web, the engagement face being arranged on the side facing the operating slide, and on the other side of the web, a catch nose being arranged pointing toward the operating slide. The lock is thus in contact with the bottom side of the operating slide and the top side of the blocking element on a housing wall of the second housing part surrounding the recess and it encompasses it, with the catch noses of the blocking elements engaging in a guide groove arranged parallel to the direction of displacement in the housing wall of the second housing part. Therefore, the lock is guided in the guide groove in the displacement operation and ensures optimum functioning of the lock as it is displaced.

The recess in the second housing part has two rectangular openings, with a shape through which the two blocking elements designed as plates can be guided parallel to the web in the closed position. This permits an especially advantageous method of disengaging the lock from the second housing part by displacement out of the guide groove and parallel to the blocking element faces, with the catch noses of the blocking elements sliding out in a direction perpendicular to the guide groove. This disengagement of the lock can preferably take place only in the closed position of the lock. Therefore, the lock can be disengaged from the second housing part only when lock is in the closed position, and the second housing part, in particular the housing cover, has been removed, only if the means of the first housing part is not in the recess between the operating slide and the blocking elements. Since the rectangular openings correspond in shape to the two blocking elements projecting away from the web at the side, the lock in the closed position can be pulled out of the recess parallel to the web by disengagement and horizontal displacement, and thus can be separated from the second housing part.

The first housing part is preferably a housing base body, and the second housing part in particular is a housing cover which is pivotally attached to the housing base body in addition to the locking arrangement. The housing cover can advantageously be suspended on two projecting pins and pivoted into the final position on the housing base body, with the blocking elements being pivotable past the inside of the housing cover in the open position next to the hooks of the housing base body. By adjusting the operating slide in the displacement direction, the blocking elements can then engage with the seating faces below the two hooks. The blocking elements are preferably arranged displaceably parallel to the pivot axis and in particular on the side of a front side of the housing. Thus, the operating slide is adjustable parallel to the front side of the housing, making it possible to operate the lock near the front side of the housing, which is usually more accessible.

DETAILED DESCRIPTION

Figure 1:
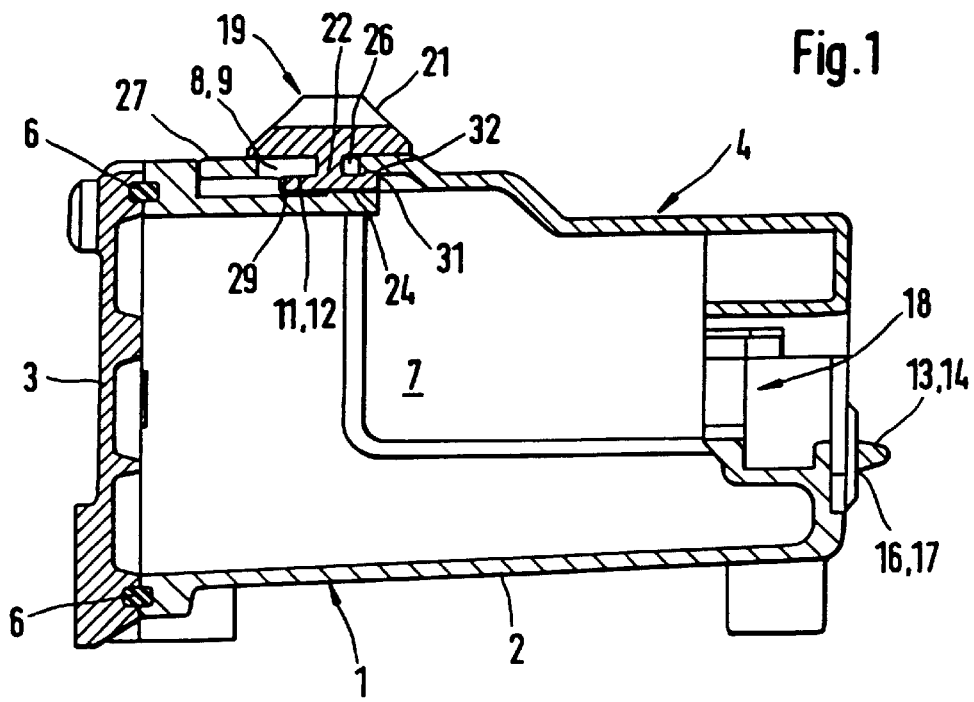
FIG. 1 shows a longitudinal section through the housing according to the present invention.

Housing 1 according to the present invention for electric switchgear and control gear in a motor vehicle has a housing base body 2 with a front cover 3 arranged on the front side and a housing cover 4 placed on housing base body 2 on the rear side. Front cover 3 has a gasket 6 to protect the electronic switchgear and control gear arranged in interior 7 of housing 1 from moisture and other environmental influences.

Near front cover 3 in the area of its front side, housing base body 2 has two hooks 8 and 9 arranged on the top of housing base body 2 and open toward the rear. A seating face 11, 12 is formed on the bottom side of each hook 8 and 9.

Housing cover 4 is placed on the top of housing base body 2 at the rear, and on its rear side it is suspended from two projecting pins 13 and 14 on housing base body 2. For this purpose, housing cover 4 has two openings 16 and 17 through which pins 13 and 14 pass. Housing cover 4 is to be pivotally suspended from the rear on pins 13 or 14 on housing base body 2. On its rear side, housing cover 4 also has a cable bushing 18 for electrical connection of the electronic switchgear and control gear in interior 7 of housing 1.

Housing cover 4 has a lock 19 at the top with an operating slide 21, a narrow web 22 and two flat blocking elements 23 and 24. Operating slide 21 is essentially flat and oriented parallel to housing wall 27 of housing cover 4 arranged around a recess 26. Narrow web 22 is perpendicular to housing wall 27, and blocking elements 23, 24 are parallel to that wall.

In the closed position of lock 19 illustrated in FIG. 1, an engagement face 29 is in contact with seating face 12 of hook 9. Hook 9 is arranged together with web 22 inside recess 26 in housing cover 4. On the side of web 22 opposite engagement face 29, blocking element 24 has a catch nose 30, 31 engaging in a guide groove 32 provided on the inside of housing cover 4 and running parallel to displacement direction V in housing cover 4.

Figure 2:
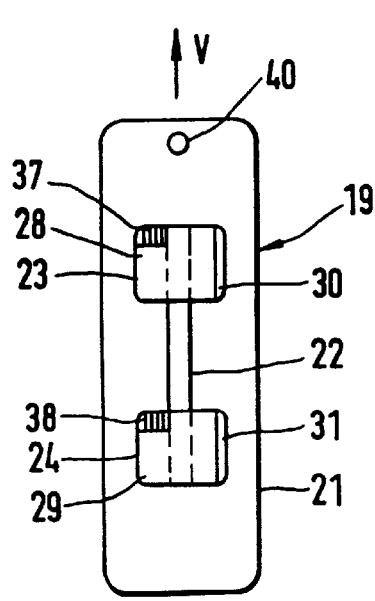
FIG. 2 shows a bottom view of the lock, separated from the housing, according to the present invention.
Figure 3:
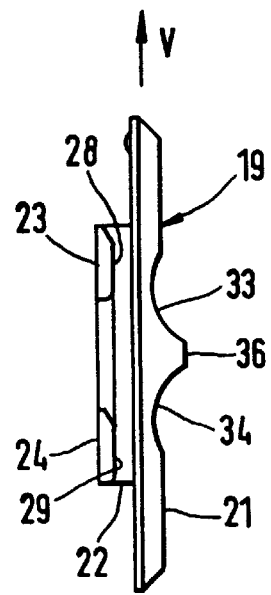
FIG. 3 shows a side view of the lock, separated from the housing, according to the present invention.

FIGS. 2 and 3 show lock 19 separated from housing cover 4. On its top side, operating slide 21 has two ergonomically shaped recessed grips 33 and 34 between which there extends a web 36 projecting away from flat operating slide 21.

On the side below operating slide 21, two blocking elements 23 and 24 are attached to narrow web 22. Blocking elements 23, 24 are designed as flat plates arranged perpendicular to narrow web 22 and projecting away from it on both sides. An engagement face 28, 29 is provided on the side of blocking elements 23, 24 arranged to the left of the web in the bottom view of lock 19 in FIG. 2. Each engagement face 28, 29 has a bevel 37 or 38 on the side lying in displacement direction V for easy displacement of the lock in closed position. On the side opposite narrow web 22, blocking elements 23, 24 have two catch noses 30 and 31 on the side facing operating slide 21. Catch noses 30 and 31 are provided for guiding lock 19 in guide groove 32.

Figure 4:
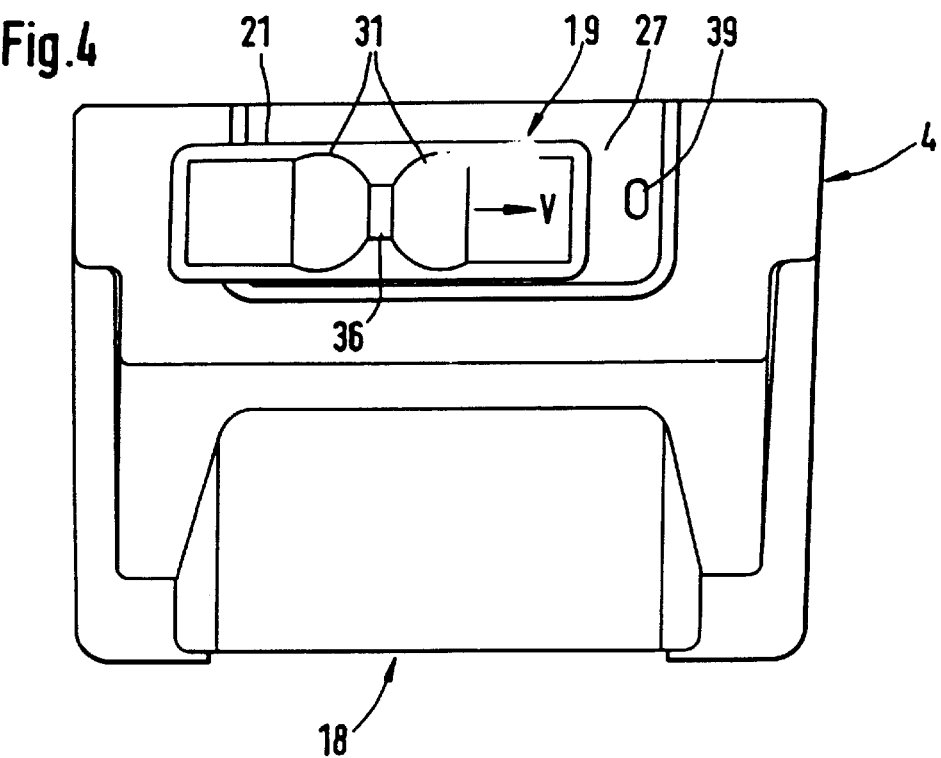
FIG. 4 shows a top view of a housing cover with lock in the open position.

Housing cover 4 illustrated in FIG. 4 shows lock 19 in open position. On the top side, housing cover 4 has a groove 39 for engaging a catch nose 40 whenever operating slide 21 is in the closed position.

Figure 5:
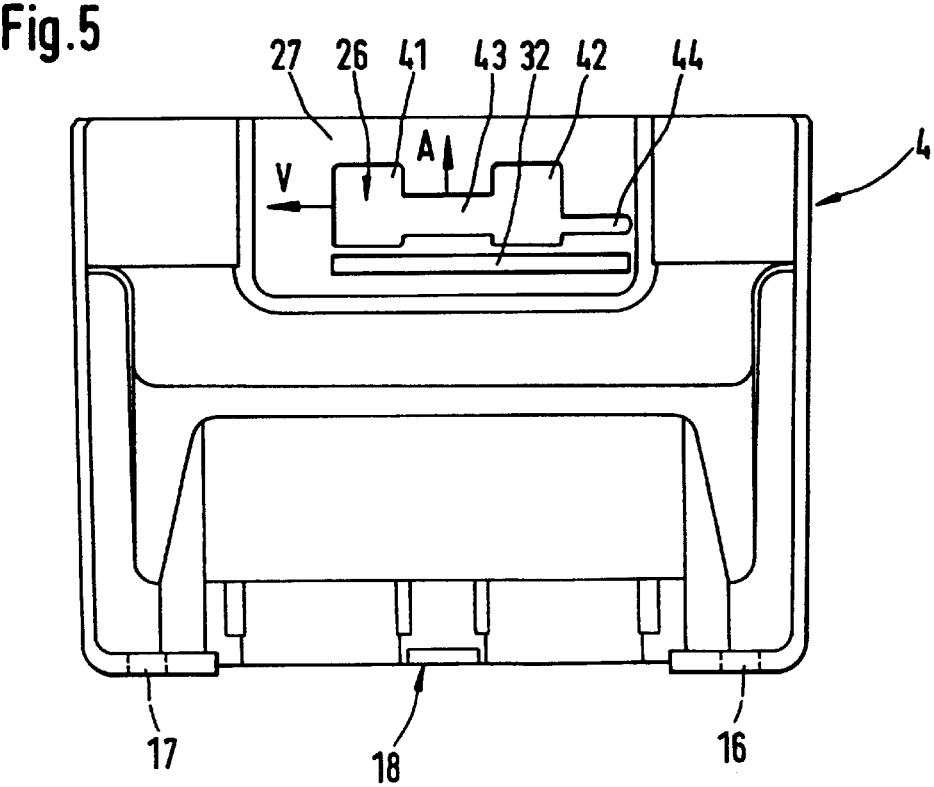
FIG. 5 shows a bottom view of the housing cover according to FIG. 4 without a lock.

FIG. 5 shows housing cover 4 in a bottom view without lock 19. On the bottom side of housing cover 4, guide groove 32 is substantially parallel to displacement direction V. Recess 26 completely encompassing housing cover 4 has two rectangular openings 41 and 42. The shape of quadrilateral openings 41 and 42 corresponds to that of flat blocking elements 23 and 24, so that lock 19, which is disengaged from guide groove 32 in the closed position with housing cover 4 removed from housing 1 can be removed from housing cover 4. To do so, lock 19 must be displaced toward the front side of the housing in the disengagement direction A, so that catch noses 30, 31 are disengaged from guide groove 32. Lock 19 with blocking elements 23, 24 can be removed upward from housing cover 4, because blocking elements 23, 24 pass through rectangular openings 41, 42 in recess 26. Between rectangular openings 41, 42, opening 43 for web 22 is broad enough to allow displacement of web 22 in the disengagement direction A when disengaged. At the side of rectangular opening 42 in the displacement direction V, recess 26 has a slot 44 through housing cover 4, so that lock 19 with its narrow web 22 can be displaced into the open position.

Lock 19 according to the present invention functions as follows: starting from the condition of the housing cover shown in FIG. 5, without lock 19, first two blocking elements 23, 24 are passed through housing cover 4 from the top side through rectangular openings 41, 42 in recess 26, and then lock 19 is displaced in the direction opposite direction A of disengagement, i.e., toward the rear side of the housing, until catch noses 30, 31 of blocking elements 23, 24 engage in guide groove 32. Therefore, lock 19 is detachably attached to housing cover 4. Engaged lock 19 can then be displaced into the open position along guide groove 32 against displacement direction V. In doing so, narrow web 22 of lock 19 slides along slot 44. This condition of lock 19 in the open position is illustrated in FIG. 4.

With its openings 16, 17 arranged on the rear side, housing cover 4 can then be suspended by rear pins 13, 14 on housing base body 2, and the top side of housing cover 4 can be pivoted down toward housing base body until hooks 8, 9 engage in rectangular openings 41, 42 in recess 26 in housing cover 4. When lock 19 is manually displaced in the displacement direction V into closed position by operating slide 21, engagement faces 28, 29 with bevel 37 and 38 slide on seating faces 11 and 12 of hooks 8 and 9 and thereby detachably attach housing cover 4 to housing base body 2.

What is claimed is:

1. A housing for accommodating one of a switchgear and a control gear comprising:

a first housing part;

a second housing part having a recess with recess walls and being detachably attached to, the first housing part;

a lock including at least one blocking element connected to an operating slide, the at least one blocking element being selectively movable in a displacement direction between an open position and a closed position by operating the operating slide, wherein the first and second housing parts are separable in the open position, and wherein the first and second housing parts are locked together in the closed position;

wherein the first housing part includes at least one means for engaging the recess walls of the second housing part, the at least one engaging means including a seating face disposed parallel to the displacement direction of the slide, and a section of the at least one blocking element contacting the seating face on a side of the recess opposite to the operating slide.

2. The housing according to claim 1, wherein the seating face is situated between the operating slide and the section in the closed position.

3. The housing according to claim 1, wherein the operating slide is displaceably positioned above the recess on an outer side of the housing, the operating slide connected to the at least one blocking element by a web.

4. The housing according to claim 3, wherein the operating slide is connected to the at least one blocking element by the web encompassing the recess.

5. The housing according to claim 3, wherein the operating slide is flat and parallel to the section, the section including an engagement face.

6. The housing according to claim 3, wherein the second housing part has a slot, the slot positioned in a housing wall of the housing at a side of the recess, and wherein the web is guided along the slot in the displacement direction.

7. The housing according to claim 1, wherein the at least one engaging means includes a hook, the section engaging under the hook with the seating face on a side of the hook facing away from the operating slide.

8. The housing according to claim 5, wherein the lock includes the at least one blocking element positioned on a narrow web in a perpendicular manner with respect to the seating face, the at least one blocking element projecting laterally from the narrow web.

9. The housing according to claim 8, wherein each of the at least one blocking element includes a catch nose engaging in a guide groove of the second housing part on a side of the web opposite the engagement face.

10. The housing according to claim 8, wherein the second housing part includes first and second rectangular openings having a shape through which the at least one blocking element is guided in a parallel manner with respect to the web in the closed position, the at least one blocking element including a plate.

11. The housing according to claim 9, wherein the lock is separable from the second housing part.

12. The housing according to claim 11, wherein the lock is separable from the second housing part by disengaging the lock from the guide groove.

13. The housing according to claim 1, wherein the first housing part includes a housing base body.

14. The housing according to claim 13, wherein the second housing part includes a housing cover suspended so that the housing cover pivots on the housing base body.

15. The housing according to claim 13, wherein the at least one blocking element is displaceable in a parallel manner with respect to a pivot axis by first and second suspension points.

16. The housing according to claim 15, wherein the at least one blocking element is displaceable in a parallel manner with respect to the pivot axis by the first and second suspension points laterally to a front side of the housing.

* * * * *